June 30, 1953 A. C. MULDER 2,644,109
VARIABLE CURRENT WELDING TRANSFORMER
Filed Oct. 2, 1950
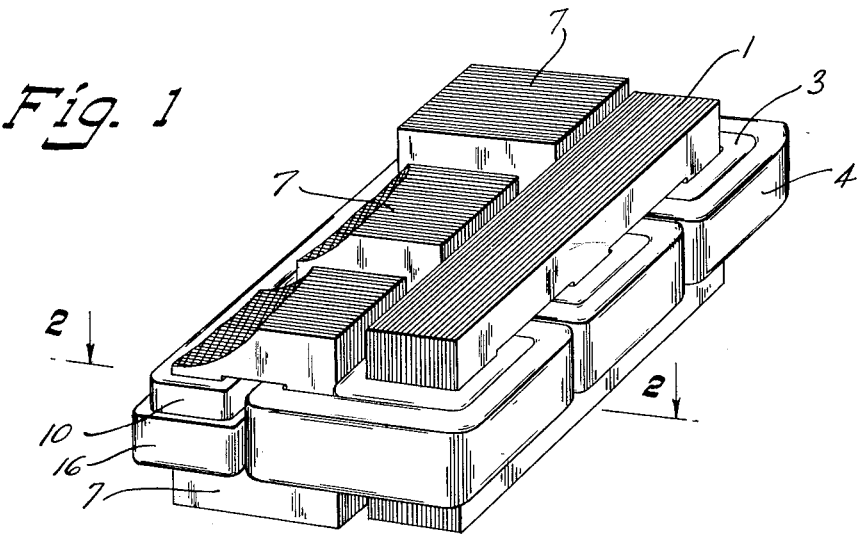
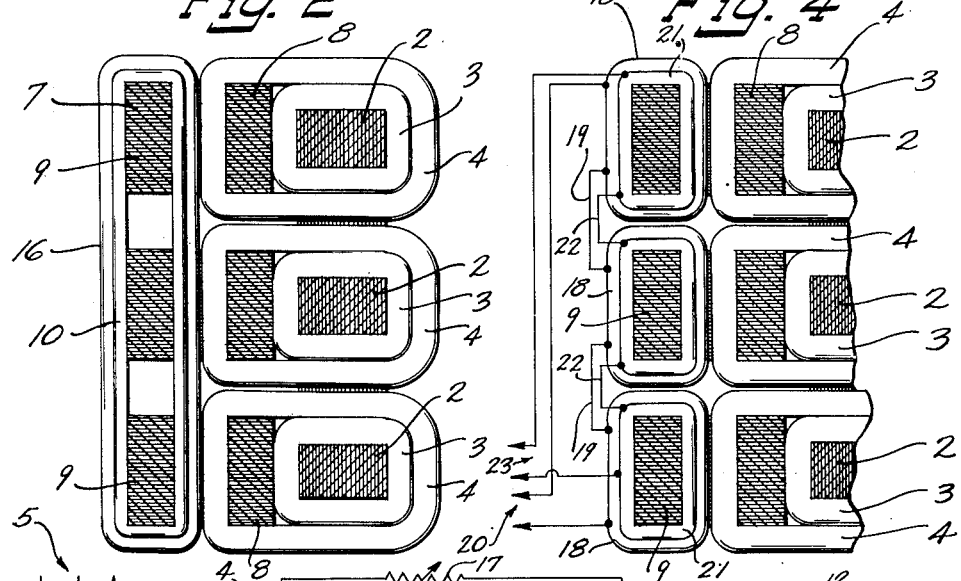
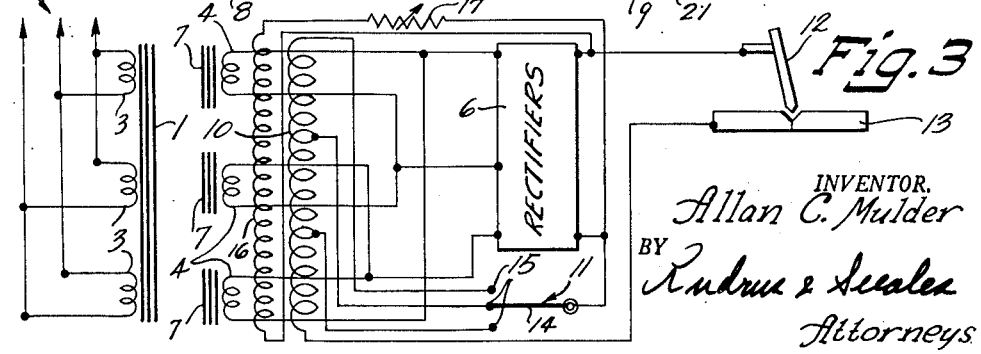
INVENTOR.
Allan C. Mulder
BY
Rudrue & Seales
Attorneys Patented June 30, 1953

2,644,109

UNITED STATES PATENT OFFICE 2,644,109

VARIABLE CURRENT WELDING TRANSFORMER

Allan C. Mulder, Appleton, Wis., assignor to Miller Electric Manufacturing Co., Appleton, Wis., a corporation of Wisconsin Application October 2, 1950, Serial No. 187,944

11 Claims. (Cl. 315—141)

This invention relates to electromagnetic controllers, and more particularly to variable current transformers for arc welding systems.

An object of the invention is to provide a highly efficient variable current transformer having no moving parts and operable to smoothly vary the transformer output over a wide range of values.

Another object of the invention is to provide a control apparatus which may be incorporated into transformers of standard design, thereby eliminating the necessity of using expensive specially designed equipment.

Another object is to provide transformer and control apparatus formed in a unitary structure to reduce the bulk of the equipment normally employed in arc welding systems and the like.

A further object of the invention is to provide a three-phase variable current transformer having direct current control windings which are adapted to prevent generation of undesirable alternating currents therein.

Another object of the invention is to provide a welding transformer current varying means wherein control cores are introduced between the transformer windings for saturation by voltage and current feedback from the rectified transformer output.

The variable current welding transformer is formed on a standard three-legged core, each leg having a primary winding energized by a source of three-phase power and a corresponding secondary winding wound exteriorly of the primary and connected through a rectifier to an arc welding electrode and to the work. The output of the transformer is controlled by means of three cores which are linked with the respective transformer secondary windings and with two control windings, the latter windings being energized for control core saturation by voltage and current feed-back from the rectifier. In another embodiment of the invention, the two control windings are replaced by two sets of series-connected windings wound on the respective control cores and balanced for cancellation of harmful alternating voltages induced therein from the secondaries.

Other objects and advantages will be set forth more fully in the following description of embodiments of the invention illustrated in the accompanying drawings.

In the drawings:

Figure 1 is a perspective view of the variable current transformer, with parts broken away to better illustrate the structure;

Fig. 2 is a horizontal section taken along line 2—2 of Fig. 1;

Fig. 3 is a schematic wiring diagram showing the arc welding system in which the transformer is incorporated; and Fig. 4 is a fragmentary view, corresponding to Fig. 2, of an embodiment of the invention wherein the control coils of the first embodiment are replaced by two sets of series connected coils.

Referring to the drawings and particularly to Figs. 1–3, the variable current transformer comprises a core 1 formed of laminated magnetizable material and having three parallel connected legs 2 spaced to receive primary windings 3 and secondary windings 4. The primaries 3 are wound one to each of the legs 2 and are independently connected across the various phases of a suitable source 5 of three-phase alternating current. The respective sets of windings 3 and 4 are preferably balanced to cause the magnetic fields produced by each phase of current to be of equal strength.

As best shown in Fig. 2, each of the secondaries 4 is wound around a core leg 2 exteriorly of its associated primary winding 3, so that the alternating primary voltage will be transformed by induction into secondary voltage for welding purposes. The secondaries are shown as connected in delta, with their outputs leading to a bank of rectifiers represented at 6 in Fig. 3. Although the rectifiers 6 may be of any variety suitable for converting the three-phase transformer output into direct current, it is preferable that barrier type selenium rectifiers be employed.

In carrying out the invention, a control core 7 is linked with each of the transformer secondary windings 4, so that the inner leg 8 of each control core is disposed between the outer surface of a primary 3 and the inner surface of the corresponding secondary 4. The cores 7 are constructed of laminated magnetizable metal and are illustrated as being rectangular in shape with their inner legs 8 connected through yokes to outer legs 9 disposed in parallel relation therewith.

The control cores 7 are saturated by flux generated in a current feed-back control coil 10 inter-linked with all three of the outer control core legs 9. To saturate the cores 7, direct current is fed back from the output of rectifiers 6 through a series connected control circuit comprising, in addition to the rectifiers 6 and control coil 10, a selector switch 11, an arc welding electrode 12, and the work 13 to be welded.

The selector switch 11 has its pivotally mounted arm 14 connected to an output terminal of the rectifiers 6 and its various terminals 15 connected, respectively, to taps on the control coil 10. With this arrangement, the number of current feedback control coil turns through which the heavy welding current flows may be varied, and the degree of control core saturation varied accordingly.

Although only three selector switch terminals 15 and control coil taps are shown, the number of terminals and taps may be increased for finer adjustment of control core saturation. It is not necessary to have a large number of terminals and taps, however, since smooth variation of control core saturation may be obtained by the voltage feed-back arrangement next to be described.

The voltage feed-back control comprises a control coil 16 linked with the three control cores 7 and connected in series with a variable resistor 17 across the output of the rectifiers 6. As illustrated in Figs. 1 and 2, the voltage feed-back control coil 16 may be disposed adjacent the current feed-back coil 10 around the outer legs 9 of the control cores.

In order to prevent the drawing of excessive current from the rectifier, the coil 16 is formed of a large number of turns of relatively fine wire. The control coil 10, on the other hand, is formed of a small number of turns of larger diameter wire to accommodate the heavy welding currents flowing therethrough under the current feed-back control arrangement previously described.

The operation of the variable current welding transformer and system is as follows: Assume that the electrode 12 is out of contact with the work and that the variable resistor 17 is set so that current flow through the shunt control coil 16 is neglible. A strong alternating magnetic field is then set up in the unsaturated control cores 7 by flux from the secondaries 4, which field induces back into the secondary windings a voltage opposite in direction to the voltage induced therein from the primaries. The control cores thus operate as impedances in the transformer secondary circuits, to reduce the current output thereof to a relatively low value.

As soon as the electrode 12 contacts the work 13, direct current will flow through the control coil 10 to saturate or partially saturate the cores 7, with the degree of saturation desired and thus determine the transformer output current depending upon the setting of selector switch 11. Saturation of cores 7 increases their reluctance and weakens the alternating magnetic field set up therein by flux from the transformer secondaries. Accordingly, the voltage induced back into the secondaries 4 by the control core field will be decreased and the transformer current output made correspondingly greater.

For fine variation of the degree of control core saturation, and thus the current output of the transformer, the variable resistor 17 in the voltage feed-back circuit is manipulated to give the desired current value. In addition to its function of providing a means for fine adjustment, the voltage feed-back circuit through coil 16 is operable, by partially saturating the control cores even while the electrode 12 is out of contact with the work, to provide a large initial welding current. The lag in welding current build-up, which would be present if current feed-back alone were employed, may thus be compensated for and the striking of the welding arc facilitated.

It is important, in order to prevent interference with the operation of the described welding current control, that no resultant alternating voltage be induced into the control coils 10 and 16. Such voltages would drive currents alternately bucking and aiding the control currents and thus cause undesirable variations in the welding current output.

With the above described transformer, the control coils 10 and 16 remain free of alternating voltages since the 120 degree phase displacement conventionally existing between the voltages of three-phase power systems is such that the magnetic fields produced by the secondaries 4 completely neutralize each other and do not operate to generate voltages in the control coils.

Referring to Fig. 4, a second embodiment of the invention is illustrated wherein other means of controlling transformer output while preventing undesirable alternating voltage generation are utilized. These means comprise a set of three separate voltage feed-back control coils 18 wound on the respective control core legs 9 in place of the single coil 16 of the first embodiment.

The coils 18 are connected in series with each other through leads 19 and are energized by a suitable source 20 of variable direct current, which current source may consist of the rectifier bank 6 and variable resistor 17 of the first embodiment.

In addition to the three coils 18 employed for voltage feed-back control, a set of control coils 21 may be utilized for current feed-back as in the case of the coil 10 of the first embodiment. Although they may be disposed at any point of the control cores 7, the coils 21 are shown as mounted, respectively, adjacent the coils 18 on the outer legs 9 of the control cores.

Similarly to the coils 18, the three current feedback coils 21 are connected by means of leads 22 in series-circuit relation with each other. The coils 21 are energized through a feed-back source, represented at 23, which comprises a selector switch, not shown, connected in series with the electrode 12 and work 13 for welding current feed-back. By manipulating the selector switch, and by altering the taps to which leads 22 are connected or by the use of other leads, the amount of control core saturation by current feed-back through coils 21 may be controlled as in the first embodiment of the invention.

Except for the fact that two sets of three series-connected control coils are employed instead of the single coils 10 and 16, the transformer structure and the use of the transformer in a direct current welding system are the same as was described in connection with Figs. 1-3. The operation of the control coils 10 and 16 in varying the transformer current output is also the same as that of the previously described embodiment.

With respect to the prevention of alternating voltage generation in the control coils, however, a different principle is utilized. Instead of the magnetic field neutralization of the first embodiment, alternating voltages are induced into the respective coils 10 and 16 but voltage neutralization is employed to cause the resultant alternating voltages in the two sets of series-connected coils to be zero.

To achieve voltage cancellation, the voltage feed-back windings 18 are accurately balanced with respect to location and number of turns so that equal voltages will be induced in each. Due to their 120 degree phase displacement, the induced voltages will effectively cancel each other to prevent alternating voltage interference with the welding current control function of the apparatus.

The three current feed-back windings 21 are also balanced, and harmful alternating voltages therein cancelled, as in the case of the voltage feed-back coils.

The apparatus described in connection with both embodiments of the invention may be used for alternating as well as direct current welding, and constitutes simple and highly effective means of varying transformer current output to an arc welding system. The use of current feed-back eliminates the necessity of providing a separate energy source capable of producing the large amount of flux necessary for effective welding current control.

Various embodiments of the invention may be employed within the scope of the following claims.

I claim:

1. A variable current transformer comprising a primary winding connected to a source of power, an output circuit including a secondary winding disposed in inductive relation with said primary winding, a control core formed of magnetizable material entirely independent of said primary winding and linked in direct inductive relationship with said secondary winding, and electrical means to vary the reluctance of said control core and consequently the impedance in the circuit of said secondary winding to control the current output of said transformer.

2. A variable current transformer comprising a transformer core of magnetizable material, a primary winding arranged on said core and connected to a source of power, an output circuit including a secondary winding arranged on said core in inductive relation with said primary, a magnetizable control core magnetically separate from said transformer core and linked in direct inductive relationship with said secondary winding external to said primary winding, and means to vary the reluctance of said control core and consequently the impedance in the circuit of the winding associated therewith to control the current output of said transformer, said means comprising a pair of coils mounted on said control core and operable to variably saturate the same when energized by a source of variable direct current.

3. A variable current welding transformer comprising a transformer core of magnetizable material, primary and secondary transformer winding wound on said core in mutual inductive relation, a magnetizable control core separate from the transformer core and linked in direct inductive relationship with said secondary winding to form an impedance in the circuit thereof, said control core being independent of said primary winding and having no effect upon the amount of exciting current flowing therein, and a control coil wound on the control core for connection with a source of variable direct current, said control coil operating to variably saturate said control core to alter the impedance in the circuit of said secondary winding and consequently the current output of said transformer.

4. A variable current welding transformer comprising a transformer core formed of magnetizable material, a primary winding wound on said core, a secondary winding wound on said core, a magnetiziable control core linked with said secondary winding and independent of said primary winding, one portion of said control core being inserted between the outer surface of said primary and the inner surface of said secondary, and a pair of control coils wound on said control core outwardly of said secondary, said control coils operating to variably saturate said control core to control the impedance in the circuit of said secondary and thus the current output of said transformer.

5. In an arc welding system, a transformer core formed of magnetizable material, a primary winding arranged on the core and connected to a source of alternating current, a secondary winding arranged on the core in inductive relation with said primary and connected through a rectifier to an arc welding electrode and to the work to be welded, a magnetizable control core linked with said secondary independent of said primary, a control coil wound on said control core and connected to said rectifier for feed-back therefrom, and means to control the amount of feed-back to said control coil and consequently the degree of saturation of said control core, whereby the impedance in the transformer secondary circuit is varied to control the current output to said welding electrode.

6. In an arc welding system, a transformer core formed of magnetizable material, a primary winding arranged on the core and connected to a source of alternating current, a secondary winding arranged on the core in inductive relation with said primary and connected to the input side of a rectifier, a magnetizable control core linked with said secondary externally of said primary and forming an impedance in the circuit of said secondary, a current feedback control coil wound on said control core and connected in series-circuit relation with a welding electrode and the work to be welded across the output of said rectifier, a voltage feedback control coil wound on said control core and shunted across the output of said rectifier, and means to vary the amount of current and voltage feed-back to said control coils and thus the degree of control core saturation and the current output of said secondary winding.

7. In a three-phase transformer of the character described, a magnetizable transformer core formed with three parallel connected legs, each of said legs having a primary transformer winding wound thereon and a secondary transformer winding wound adjacent said primary, three magnetizable control cores linked one with each of said secondaries to form impedances in the circuits thereof, said control cores being external to said primary windings and having no effect upon the exciting currents flowing therein, a first control coil linked with said three control cores and operable when energized by direct current to saturate the control cores and decrease the impedances thereof, and a second control coil linked with said three control cores for fine adjustment of the degree of saturation thereof and thus of the current output of said transformer, said control coils being disposed with relation to said transformer windings to utilize magnetic field cancellation and prevent the induction of alternating voltages into said control coils.

8. In an arc welding system, a three-legged transformer core formed of magnetizable material, primary windings arranged one on each leg of said core and connected across the various phases of a source of three-phase alternating current, secondary windings arranged, respectively, in inductive relation with said primaries and connected through rectifying means to an arc welding electrode and to the work to be welded, three magnetizable control cores linked one with each of said secondaries externally of said primaries and forming impedances in the circuits of said secondaries, a control coil linking all of said control cores and connected for feed-back from the output of said rectifying means, and means to control the amount of feed-back to said control coil and consequently the degree of control core saturation and the current output of said secondaries, the relation between said control coil and the fields of said windings being such that no alternating current is induced into said control coil.

9. In a three-phase transformer of the character described, a magnetizable transformer core formed with three parallel connected legs, each of said legs having a primary winding wound thereon and a secondary winding wound adjacent said primary, three magnetizable control cores linked one with each of said secondaries externally of said primaries to form impedances in the circuits of said secondaries, and three series-connected control coils linked one with each of said control cores and operable when energized by direct current to saturate the control cores and decrease the impedances thereof to vary the output of said transformer, said series-connected coils being balanced to cause cancellation of alternating voltages induced therein and thus prevent interference with the control of the transformer current output.

10. In an arc welding system, a three-legged transformer core formed of magnetizable material, primary windings arranged one on each leg of said core and connected across the various phases of a source of three-phase alternating current, secondary windings arranged, respectively, in inductive relation with said primaries and connected through rectifying means to an arc welding electrode and to the work to be welded, three magnetizable control cores linked one with each of said secondaries externally of said primaries and forming impedances in the circuits of said secondaries, three current feed-back control coils linked, respectively, with said control cores and connected in series with each other and with said welding electrode and work across the output of said rectifier, and three voltage feed-back control coils mounted on said control cores and connected in series-circuit relation across the output of said rectifier, said control coils being balanced to cause cancellation of alternating voltages induced therein and thus prevent interference with the control of the welding current output of said secondaries.

11. In a three-phase transformer, magnetizable transformer core means, three primary transformer windings arranged on said transformer core means and connected to a power source to be supplied by corresponding phases of a three-phase alternating current, three secondary transformer windings arranged on said transformer core means in inductive relation with the respective primary windings, magnetizable control core means linked in direct inductive relationship with said secondary windings independently of said primary windings, and means to vary the reluctance of said control core means and consequently the impedance in the circuits of said secondary windings to control the current output of said transformer.

ALLAN C. MULDER.

References Cited in the file of this patent

UNITED STATES PATENTS

| Number | Name | Date |
|---|---|---|
| 1,835,209 | Dowling | Dec. 8, 1931 |
| 1,928,848 | Crout | Oct. 3, 1933 |
| 1,997,234 | Schmerber | Apr. 9, 1935 |
| 2,068,883 | Klinkhamer | Jan. 26, 1937 |
| 2,142,837 | Edwards | Jan. 3, 1939 |
| 2,265,930 | Scott | Dec. 9, 1941 |
| 2,454,582 | Thompson | Nov. 23, 1948 |

FOREIGN PATENTS

| Number | Country | Date |
|---|---|---|
| 388,555 | Germany | Sept. 22, 1920 |